APPARATUS FOR CONTROLLING AUDIO TRANSDUCING SYSTEMS
Filed March 23, 1953
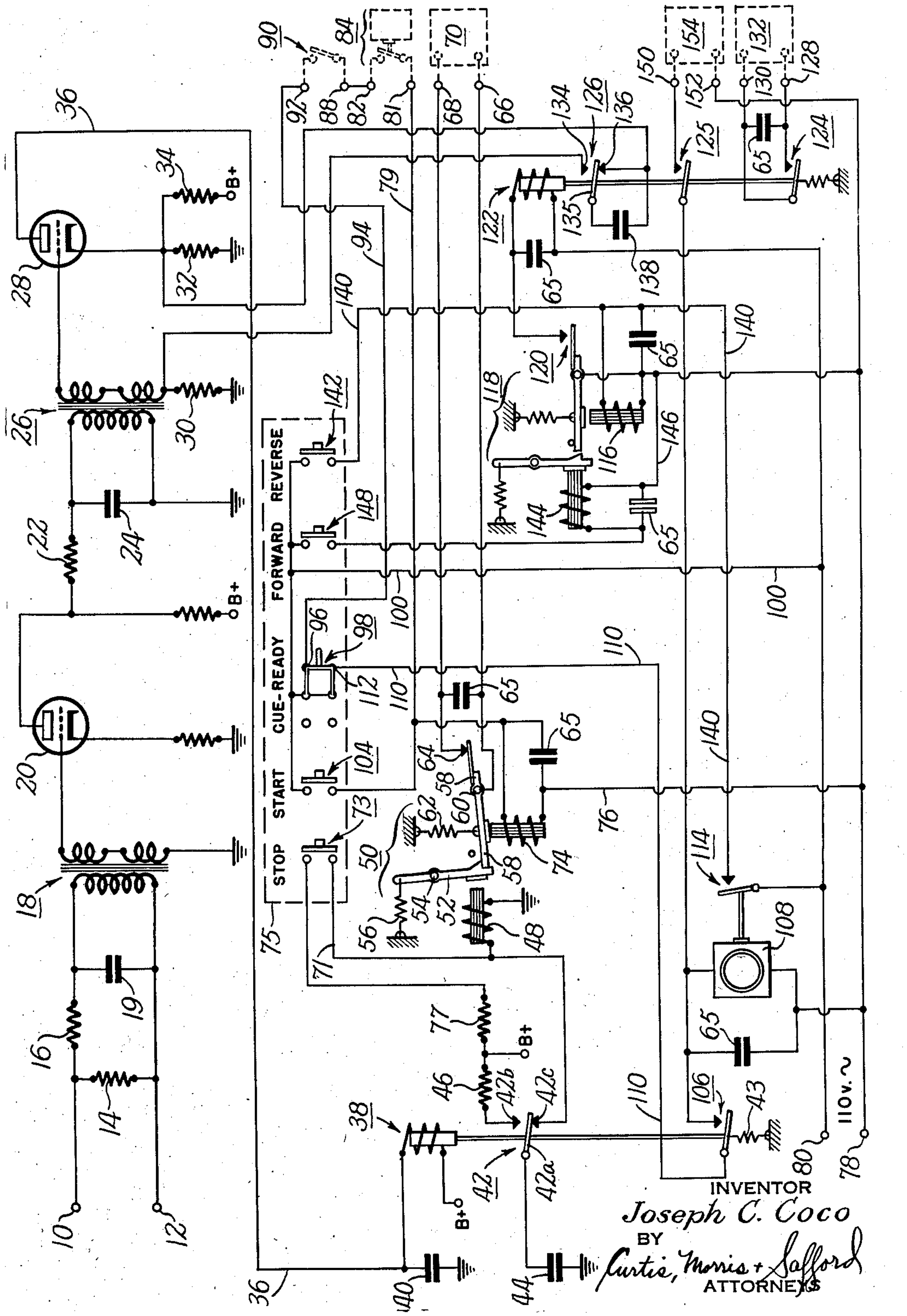
INVENTOR
Joseph C. Coco
BY
Curtis, Morris + Safford
ATTORNEYS United States Patent Office 2,802,060

Patented Aug. 6, 1957

2,802,060

APPARATUS FOR CONTROLLING AUDIO TRANSDUCING SYSTEMS

Joseph C. Coco, New York, N. Y., assignor to Muzak Corporation, New York, N. Y., a corporation of New York Application March 23, 1953, Serial No. 343,960

10 Claims. (Cl. 179—100.1)

The present invention relates to apparatus for automatic control of audio transducing (i. e., recording and/or reproducing) systems, and is particularly adapted for controlling the operation of dual track magnetic tape transducers for the wired broadcasting of musical programs.

In commercial systems for broadcasting musical programs by wire to subscription clients, as in the system known by the trademark "Muzak," it has been the routine practice to originate such programs in one or more central studios in each metropolitan area, in each of which studios there were provided a pair of reproducing turntables which were used in alternation by the studio operator to provide substantially uninterrupted programs. In each of the larger metropolitan areas it has been customary to provide a choice of several programs of different content, for example, classical music, popular music, etc. This means that in each of such metropolitan areas there have been required the full-time services of a number of studio operators, entailing not only appreciable capital outlay but also substantial running expenses. This has tended to limit the availability of wired music service to the larger metropolitan areas and has made it unavailable to smaller communities where the number of potential subscribers has not been sufficient to justify the expense necessary to maintain a sizable staff of full-time studio employees.

It is accordingly among the objects of the present invention to provide apparatus for substantially automatic control of the studio reproduction equipment, so that a single part-time or full-time operator can handle all of the equipment necessary for broadcasting one or more continuous programs of wired music. It is also an object of the invention to provide such control apparatus which is relatively simple and inexpensive in construction, and which is reliable in operation. Other objects will be in part apparent and in part pointed out hereinafter.

The particular embodiment of the invention which is shown and described herein is designed for control of dual track magnetic tape transducing systems used in broadcasting programs which are divided into segments, each segment originating on the quarter hour and lasting for some 13½ minutes. The automatic starting of the program segments at 15-minute intervals is accomplished by means of a clock timer, while the stopping of the tape is accomplished by means of low-frequency control signals of relatively short duration recorded on the tape at points corresponding to approximately 14 minutes following the start of each program segment. Longer control signals are employed to accomplish the automatic reversal of the tape at the completion of recording or reproduction of the first or "forward" record track, and the stopping of the transducer and switching of operation to another transducer at the completion of recording or reproduction of the second or "reverse" track.

The single figure of the drawings comprises a schematic diagram of a control apparatus embodying features of the present invention.

In the use of the present invention, the magnetic tapes are ordinarily first prepared by recording on the tapes the control signals which are utilized to control the various operations of the transcription equipment. Twenty-five cycles per second has been chosen as the frequency of the control signals, since it is below the lower limit of the range of most audio amplifying systems. Thus, even without the use of wave traps, high-pass filters or other special devices, the control signal will not be audible at the loudspeakers of the various subscribing installations. However, if, due to peculiar circumstances, the twenty-five-cycle control signal does become troublesome at any one or more of the subscribing installations, it may readily be filtered out by any of a number of well-known expedients.

The control signals are recorded on the tape "full-track," that is, they are recorded so as to occupy a sufficient portion of the width of the tape so that the pick-up heads will detect the control signals during playback of either one of the record tracks. The control signals which effect the stopping of the tape at the end of each segment of the program are of eight seconds duration, and they are recorded on the tape at spaced intervals corresponding to 14 minutes of running time at the usual tape speed. In addition, at each end of the tape there are recorded similar control signals of approximately 32 seconds' duration, one of which signals is used to effect reversing of the tape at the completion of recording or reproduction of the forward track and the other of which is employed to effect switching from one transducer to another upon completion of the reverse track.

This recording of the control signals may be accomplished manually or by suitable automatic timing apparatus. If desired, it may be accomplished at several times the speed at which the tape will ultimately be transcribed. For example, if the transcription is to be at 3¾ inches per second, the recording of the control signals may be accomplished at a tape speed of, say, 4 times the transcription speed, or 15 inches per second. At this tape speed, the control signals must be recorded at 100 cycles per second, so that when the tape speed is cut to one-fourth for playback, they will appear as twenty-five-cycle signals.

After the control signals have been recorded on the tape, the musical program is then recorded. As mentioned hereinabove, the musical program is divided into segments which commence each quarter hour and last for approximately 13½ minutes each. The start of each segment of the program coincides with or shortly follows the end of each of the control signals. Since the control signals are spaced at 14-minute intervals along the tape, the end of each segment of the musical program falls some ½ minute ahead of the commencement of the next control signal. It will thus be understood that the tape may be cut at any one of the full-track recorded control signals without the danger of cutting into a program segment on either the forward or reverse tracks. Editing of the tapes is therefore a simple matter. As will be discussed more fully hereinafter, the apparatus which is described herein may be used not only in playback of the tape but it also may be used for automatic control of recording of the musical programs on the tape, after the control signals have been recorded thereon.

For playback, the tape is fed through a conventional tape reproducing machine which includes a supply reel and a take-up reel, a capstan continuously driven by an electric motor, a pressure roller arranged to press the tape against the capstan to cause the capstan to drive the tape, and a pick-up head arranged to detect the magnetic signals which are recorded on the tape. The reproducing machine may also be provided with a separate recording head, as in conventional tape transducers. The signals detected at the pick-up head during playback are passed through a conventional audio amplifier in the studio and then are distributed through the telephone lines to the various subscribers. At the subscribing installations, the musical signals are again amplified, if necessary, and are fed to one or more loud speakers.

The control circuit shown in the single figure of the drawings is adapted to be bridged across the output of the studio amplifier. In the figure, the numerals 10 and 12 at the upper left-hand corner designate the input terminals of the control apparatus, which are connected to the output terminals of the audio amplifier. The audio amplifier used in the studio should be of sufficiently broad frequency response to pass the twenty-five-cycle control signals which are detected at the pickup head of the reproducing machine along with the signals which represent the musical program. Across the terminals 10 and 12 there will accordingly be imposed an audio frequency voltage representing both the musical program and the twenty-five-cycle control signals.

A terminating resistor 14 is shunted across the input terminals 10 and 12 to match the output impedance of the audio amplifier. Also connected across the terminals 10 and 12, in series with an isolating resistor 16, is the primary of an audio transformer 18. A condensor 19 is connected across the primary of transformer 18 to form a parallel tuned circuit which is resonant at twenty-five cycles. The isolating resistor 16 prevents the terminating resistor 14 and the output impedance of the audio amplifier from loading this parallel tuned circuit and gives the circuit a relatively high Q. The effect of this tuned circuit is to discriminate against the audio voltages corresponding to the musical program and to tend to pass only the twenty-five-cycle control signals.

The secondary of transformer 18 is connected between ground and the grid of a triode vacuum tube 20 which is connected as a shunt-fed amplifier, with the plate of the tube connected through an isolating resistor 22 and a parallel tuned circuit comprising a condensor 24 and the primary of an audio transformer 26 to ground. This parallel circuit is also resonant at twenty-five cycles and further serves to attenuate all but the twenty-five-cycle control signals.

One end of the secondary of transformer 26 is connected to the grid of a triode vacuum tube 28, and the other end of the secondary is connected through a high resistance 30 to ground. The cathode of tube 28 is connected to the junction of a relatively low resistance 32, which is connected to ground and a relatively high resistance 34 which is connected to the positive terminal of a direct current power supply. The resistors 32 and 34 thus form a voltage-dividing network and apply to the cathode of tube 28 a positive voltage sufficient to bias it normally to cutoff. However, during the positive half-cycles of the incoming twenty-five-cycle signals, the grid of tube 28 is driven sufficiently positive to cause tube 28 to conduct.

The plate of tube 28 is connected through a lead 36 and the winding of a signal relay 38 (at the left center of the figure) to the positive terminal of the plate power supply, so that when tube 28 conducts, current will be drawn through the winding of signal relay 38 and the relay will be energized. A smoothing capacitor 40 is connected between the plate of tube 28 and ground to smooth the pulsating direct current flowing through the winding of relay 38, so that the relay 38 is energized throughout the duration of the twenty-five-cycle control signals.

The signal relay 38 has a set of single-pole-double-throw contacts generally indicated 42. The movable contact **42*a* of this relay section 42 is connected to one side of a storage capacitor 44, the other side of which is connected to ground. When the signal relay 38 is energized, the movable contact 42*a* is moved upwardly to engage a fixed contact 42*b* which is connected through a charging resistor 46 to the positive terminal of the D. C. power supply. Thus, during the receipt of a control signal, the storage capacitor 44 charges from the power supply through the charging resistor 46**.

At the termination of the control signal, the signal relay 38 is deenergized and its movable contact **42*a* is permitted to be moved by a spring 43 from the fixed contact 42*b* into engagement with the other fixed contact 42*c*. The latter fixed contact is connected to one side of the "release" winding 48 of a conventional type latching relay which is generally indicated at 50, and referred to hereinafter as the "start-stop" relay, the other side of the release winding 48 being connected to ground. This will permit the capacitor 44 to discharge through the release winding 48 and energize it to attract the latching armature 52, and cause it to move in a clockwise direction (as viewed in the drawing) about its pivot 54 against the resistance of a spring 56 and allow the lower end of the latch 52 to clear the end of another armature 58. The latter armature 58, which is pivoted at 60 and is urged in a clockwise direction, as viewed in the drawings, by means of a spring 62, is thus free to move to its normal unlatched position at which contact portion of armature 58 engages a fixed contact 64. The effect of cessation of the control signal is thus to open the start-stop relay contacts 58, 64**.

The contacts 58, 64 of the start-stop relay 50 are connected across the output terminals 66 and 68 of the control chassis. As indicated in broken lines, these terminals 66 and 68 are adapted to be connected to a solenoid 70 which controls the movement of the pressure roller which, during normal running, presses the tape against the continuously rotating capstan. De-energization of the solenoid 70 allows the spring-loaded pressure roller to move away from the capstan. Thus de-energization of the solenoid 70, which takes place upon the termination of the twenty-five-cycle control signal, causes the tape to stop. The condenser 65 which is connected across the contacts 58, 64, and the other condensers throughout the circuit, to which the same reference number 65 has been applied, are employed as spark suppressers.

The time constant of the RC circuit including capacitor 44 and charging resistor 46, is such that a twenty-five-cycle signal of at least four seconds' duration is required for the capacitor 44 to charge to sufficient value to actuate the release solenoid 48. The eight-second signal which is used to effect stopping of the tape is of sufficient duration to accomplish this function with a good margin of safety; however, transient voltages, such as those caused by electrical noise and the like, are rarely, if ever, of sufficient duration to cause actuation of the release solenoid 48 so that the danger of false stoppage of the transcription equipment is minimized.

The release winding 48 of the latching relay 50 also may be energized under manual control. The left-hand or ungrounded end of the winding, as viewed in the drawings, is also connected through a lead 71 to one contact of a single-pole-single-throw, momentary contact push-button "stop" switch 73 on the control panel 75 of the apparatus. The other contact of switch 73 is connected through a dropping resistor 77 to the positive terminal of the power supply. Closure of the stop switch 73 thus causes current to flow from the power supply through the release winding 48 to energize this winding and cause relay 50 to move to the unlatched position, de-energizing the pressure roller solenoid 70 and stopping the tape. The tape may thus be stopped under manual control at any desired time.

The relay 50 also has an "operate" winding 74 which is arranged so as to cause counterclockwise movement of the armature 58, as viewed in the drawings, against the resistance of the spring 62. As the armature 58 so moves, its end rides over the inclined upper surface of the latch on armature 52 and cams the armature 52 in a clockwise direction against the resistance of the spring 56, until the end of the armature 58 clears the protruding latch and allows the spring 56 to move the armature 52 back to the position shown in the drawing, at which the latch hooks over the end of the armature 58 and holds it in the downward position.

One terminal of the operate winding 74 is connected through a lead 76 to one terminal 78 of an alternating current power source. The other terminal of winding 74 is connected through a lead 79 to one of a pair of terminals 81 and 82 which are adapted to be connected across the contacts of a clock timer diagrammatically indicated at 84. The other terminal 82 is connected to one terminal 88 of a pair of terminals 88 and 92 which are adapted to be connected across a pair of transfer relay contacts diagrammatically indicated at 90. The transfer relay contacts 90 are used for switching from one transducer to another, as will be described more fully hereinafter; they are closed throughout operation of the particular transducer with which they are associated. The other terminal 92 of this pair of terminals is connected through a lead 94 to one fixed contact 96 of a double-pole-single-throw "cue-ready" switch 98 which is mounted on the control panel 75. When the cue-ready switch 98 is in the closed or "ready" position, the fixed contact 96 is connected through a lead 100 with the other terminal 80 of the A. C. power source.

It will thus be seen that with the transfer relay contacts 90 closed and the cue-ready switch 98 in the "ready" position, the apparatus is conditioned so that closure of the contacts of the clock timer 84 will energize the operate winding 74 of the relay 50 and move the armature 58 to the latched position shown in the drawings. This will close the relay contacts 58, 64 and energize the pressure roller solenoid 70 to cause the pressure roller to press the tape against the rotating capstan and start the tape. The clock timer 84, as previously mentioned, is adjusted to start the tape on each quarter hour; a conventional 15-minute recycling timer thus serves satisfactorily in this role.

As previously mentioned, each segment of the musical program lasts for about 13½ minutes. After completion of each program segment, the tape continues to run for approximately ½ minute until the eight-second "stop" signal is reached. The receipt of this stop signal energizes the signal relay 38 and allows storage capacitor 44 to charge. The cessation of the 8-second stop signal de-energizes the signal relay 38 and allows storage capacitor 44 to discharge through solenoid 48 unlatching the start-stop relay 50 and de-energizing the pressure roller solenoid 70 to stop the tape. The tape will remain stopped until the clock timer 84 tolls the commencement of the next 15-minute interval, upon which the tape will be started again for the following segment of the musical program. This cycle of starting and stopping will be repeated for the full length of the "forward" track of the tape.

Means is also provided for starting the tape at any time under manual control. To this end, the upper terminal of the operate winding 74 of start-stop relay 50 is connected through a lead 102 and a single-pole-single-throw momentary contact push-button "start" switch 104 on the control panel 75 to the lead 100 which extends from the terminal 80 of the A. C. power supply. Manual closure of the start switch 104 thus energizes the operate winding 74, closing the contacts 58 and 64 and energizing the pressure roller solenoid 70 to cause driving of the tape.

As above mentioned, twenty-five-cycle control signals of 32 seconds' duration are recorded at each end of the tape. As the end of the forward track of the tape is approached, one of these 32-second signals is encountered. This signal results in energization of the signal relay 38 in the manner described above. In addition to the contacts 42 previously mentioned, the signal relay 38 has another set of contacts generally indicated 106 and appearing at the lower left-hand corner of the figure. These single-pole-single-throw contacts 106 are closed upon energization of the signal relay 38 to connect one side of a 14-second timer 108 through a lead 110 with the fixed contact 112 of the remaining pole of the cue-ready switch 98. When the cue-ready switch is in the "ready" position, the fixed contact 112 is electrically connected to the lead 100 which extends from the terminal 80 of the A. C. power source. The other terminal of the 14-second timer 108 is connected directly to the other terminal 78 of the A. C. source. Thus, whenever the cue-ready switch 98 is in the "ready" position, the receipt of a twenty-five-cyle signal initiates operation of the 14-second timer 108.

The timer 108 is of the conventional type having a pair of contacts 114 which are closed 14 seconds after the operation of the timer commences. If the timer is stopped before 14 seconds has elapsed, it is automatically restored to its starting condition. The 8-second control signals which are employed to stop the tape after each segment of the musical program accordingly do not result in closure of the contacts 114. However, upon receipt of the 32-second control signal at the end of the tape, the 14-second timer 108 is set in operation, and, after approximately 14 seconds of the signal, the switch contacts 114 are closed.

Closure of the contacts 114 effectively connects the terminal 80 of the A. C. source to one terminal of the "operate" winding 116 of a "forward-reverse" relay generally designated 118 and appearing in the lower right-hand portion of the figure. The other terminal of the operate winding 116 is connected directly to the other terminal 78 of the A. C. source. The closure of the timer contacts 114 thus energizes the operate winding 116 of the "forward-reverse" relay 118.

The forward-reverse relay 118 is of the latching type and is generally similar in construction and operation to the start-stop relay 50 which has previously been described. The energization of the operate winding 116 places the forward-reverse relay 118 in the latched position at which the relay contacts 120 are closed. The closing of the contacts 120 connects one terminal of the winding of a slave relay 122 (appearing in the lower right-hand corner of the figure) to the terminal 78 of the A. C. source, while the other terminal of the winding of relay 122 is connected directly to the other terminal 80 of the A. C. source. The slave relay 122 is thus energized each time the operate winding 116 of the forward-reverse relay 118 is energized.

The slave relay 122 has three sections 124, 125 and 126. The section 124, which is shown in the figure as the lowermost of the three sections, is a single-pole-single-throw switch which is closed when the slave relay 122 is energized. The contacts 124 are connected between a pair of output terminals 128 and 130 which are adapted to be connected across to the winding of a reversing relay diagrammatically indicated at 132. The contacts of the reversing relay 132 are so arranged as to reverse the connections to the electric motor which drives the capstan of the reproducing machine and cause the capstan to be rotated in the opposite direction. Therefore, after approximately 14 seconds of the 32-second signal, the direction in which the tape is driven is reversed.

In reversing, the capstan driving motor and capstan must come to a momentary stop. Since production of the twenty-five-cycle signal at the input of the control apparatus is dependent upon movement of the tape, the momentary stoppage of the tape on reversal inevitably results in extinguishing the control signal. Unless protective measures were taken, this would result in the de-energization of the signal relay 38 and discharging of the storage capacitor 44 through the "release" winding 48 of the start-stop relay 50 to stop the tape. The tape would remain stopped until it was restarted manually by closure of the start switch 104 or automatically by the 15-minute timer 84.

In order to prevent such false stops, means is provided for inserting into the amplifier a "holding" voltage which keeps the signal relay 38 energized until the tape has resumed movement in the reverse direction. The section 126 of the slave relay 122 is utilized to accomplish this purpose. This section has single-pole-double-throw contacts, one of the fixed contacts 134 being connected to the lower end of the secondary of the interstage audio transformer 26 at the input of tube 28. The other fixed contact 136 is connected to the cathode of tube 128 and to one side of a condenser 138, the other side of which is connected to the movable contact 135 of the relay section 126.

Energization of the slave relay 122 for reversal of the tape moves the contact 135 of relay section 126 from the lower position in which it is shown in the figure to the upper position at which it engages the fixed contact 134. This results in connecting the condenser 138 between the cathode of tube 28 and the lower end of the secondary of transformer 26. It requires a finite time for the condenser 138 to charge through resistor 30 so that momentarily the cathode and grid of tube 28 are at substantially the same potential. This removal of the negative grid bias from tube 28 causes the tube to conduct strongly and draw current through the winding of signal relay 38.

The values of condenser 138 and resistor 30 are chosen so that it requires at least of the order of four seconds for condenser 138 to charge to a voltage equal to the cut-off bias of tube 28. Thus, the tube will continue to conduct for approximately four seconds, during which signal relay 38 will continue to be energized. Since it requires only about two seconds for the capstan driving motor to come to a stop and to reach full running speed in the reverse direction, the possibility of false stoppage of the tape during the reversing cycle is substantially eliminated. The condenser 138 remains connected in the circuit throughout the reverse movement of the tape, but once it becomes charged it has no further effect on the operation of the circuit. The contacts 135, 136 of slave relay 122 are closed to short condenser 138 during forward movement of the tape to assure that there is no residual charge on the condenser at the commencement of the reversing cycle.

After reversing direction, the tape will continue to be driven back to the end of the 32-second control signal. When the end of this signal is reached, the signal relay 38 will be de-energized, resulting in the actuation of start-stop relay 50 to the unlatched or "stop" position, and the stopping of the tape. The tape will thus remain stopped until the 15-minute timer 84 signals the commencement of the next quarter-hour period, unless the tape is restarted before that time by closure of the manual start switch 104.

The operate winding 116 of the forward-reverse relay 118 is also arranged so that it may be energized under manual control. The upper terminal of the winding 116 is connected through a lead 140 with one contact of a single-pole-single-throw momentary contact push-button "reverse" switch 142 on the control panel 75. The other contact of switch 142 is connected through the lead 100 with the terminal 80 of the A. C. source. The closure of the reverse switch 142 accordingly energizes the operate winding 116 of the forward-reverse relay 118 and results in driving of the tape in the "reverse" direction at any time, as the operator desires.

The "release" winding 144 of the forward-reverse relay 118 is also arranged to be energized under manual control, so that the direction of movement of the tape may be changed and the tape driven in the "forward" direction at any desired time. For this purpose, one terminal of the winding 144 is connected through a lead 146 to the terminal 78 of the A. C. source, while the other terminal of winding 144 is connected to one contact of a single-pole-single-throw momentary contact push-button "forward" switch 148 on the control panel 75. The other contact of switch 148 is connected through the lead 100 with the other terminal 80 of the A. C. source. Closure of the forward switch 148 thus energizes the release winding 144 of the forward-reverse relay 118, which results in unlatching the relay and allowing it to move to the position illustrated in the figure at which the contacts 120 are open and the slave relay 122 and the reversing relay 132 are deenergized to cause the capstan motor to be driven in the forward direction.

In the absence of such manual control, the tape will continue to be driven in the reverse direction until it approaches the end of the tape. During its reverse travel, of course, the tape is driven intermittently under control of the 8-second "stop" signals and the 15-minute timer 84 to produce the successive segments of the musical program. As the "beginning" end of the tape is approached the other 32-second control signal is encountered.

The receipt of this signal causes energization of the signal relay 38. The energization of this relay closes its contacts 106 and initiates operation of the 14-second timer 108. After 14 seconds of operation of the timer 108, its contacts 114 are closed to energize the operate winding 116 of the forward-reverse relay 118. However, since this relay is already in the latched position, in which it remains during the reverse travel of the tape, the energization of the winding 116 has no effect upon it.

The third set of contacts 125 of the slave relay 122 are single-pole-single-throw contacts which are closed by energization of the relay 122 during reverse travel of the tape. When these contacts 125 are closed, a pair of output terminals 150 and 152 are effectively connected to the respective terminals of the 14-second timer 108. The terminals 150 and 152 are adapted to be connected to a transfer timer which is diagrammatically indicated at 154. The transfer timer 154 is thus effectively connected in parallel with the 14-second timer 108 and, during reverse travel of the tape, is set in operation concurrently with the 14-second timer each time a control signal is received. The transfer timer 154 is a 24-second timer which is mounted on a transfer panel adapted to control the operation of two or more transducers.

After 24 seconds of the 32-second control signal have elapsed, the contacts of the transfer timer 154 are closed to switch the audio input of the studio amplifier to the audio output of a different transducer and to place the control circuit of the other unit in such condition that the operation of the other unit will be initiated on the next quarter hour by the time clock 84. In other words, a pair of contacts like the contacts 90 in the upper right in the figure are provided for each of the transducers, the several sets of contacts being actuated by a relay under control of the transfer timer 154. The transfer timer thus effectuates the switching of operation from one transducer to another. The transfer timer 154 is not actuated during the forward movement of the tape due to the fact that the contacts 125 of the slave relay 122 are open. During the reversing cycle, the transfer timer accordingly runs only during the 14 seconds required to return to the end of the reversing control signal. This 14-second interval is insufficient to cause actuation of the 24-second transfer timer, so that there is no false transferral during the reversing cycle.

It will accordingly be appreciated that the studio operator may set up, for example, two transducers and leave the apparatus on automatic control until near the end of the cycle of operation of the second unit. Where conventional 4800-foot reels of tape are employed, at the aforementioned tape speed of 3¾ inches per second, each tape will have a running time of four hours for each track, or 8 hours for the two tracks on each tape and a total of 16 hours for the two transcribers. Where two transducers are employed, the operator may set up the machines and leave them for automatic operation, returning some 16 hours later to reset the machines for the next 16-hour period. And, as will be understood, even greater numbers of transducers may similarly be employed to give proportionately longer periods of fully automatic operation.

In setting up a transducer for automatic control, the operator threads the tape through the machine, places the cue-ready switch 98 in the "cue" position, presses the forward switch 148 and the start switch 104. The capstan driving motor is thereby started to drive the tape in the forward direction, and the tape will "run in" through the first 32-second control signal. At the end of this signal, the signal relay 38 is de-energized, which moves the start-stop relay to the unlatched or "stop" position and results in stopping of the tape. The 14-second timer 108, and the 24-second transfer timer 154 do not operate during this run-in, because the cue-ready switch 98 is in the "cue" position, which breaks the circuit from the upper terminal of the 14-second timer 108 through leads 110 and 100 to the A. C. supply terminal 80. The 32-second control signal which is encountered during run-in accordingly does not produce reversal of the tape or transfer of operation to another machine. After the run-in is complete and the tape has stopped, the operator may throw the cue-ready switch 98 to the "ready" position to condition the apparatus so that, at the appropriate time, the clock timer 84 will start the tape for recording or reproduction of the first program segment thereof.

As will be understood, the automatic starting of the tape at regularly timed intervals, both for recording and reproducing, and the automatic stopping of the tape after completion of each segment of the program under control of signals recorded on the tape itself, results in elimination of cumulative errors of timing such as might be caused by stretching of the tape, variations in tape speed and similar factors. It will also be apparent from the foregoing exposition that the control apparatus which the present invention provides makes possible reliable automatic control of the wired broadcasting of musical or other programs, thereby enabling such programs to be made available at considerably reduced operating cost.

It will therefore be appreciated that the aforementioned as well as other desirable objects have been achieved. However, it should be emphasized that the particular embodiment of the invention shown and described herein is intended as merely illustrative and not as restrictive of the invention.

I claim:

1. Apparatus for controlling the operation of a magnetic tape audio transducing system, said apparatus comprising an amplifier tuned to a control frequency, a signal relay controlled by the output of said amplifier, a capacitor adapted to be connected to an electrical power source through the contacts of said signal relay whereby said capacitor is charged at a predetermined rate during receipt of a signal of said control frequency at the input of said amplifier, and a start-stop relay having a winding adapted to be connected to said capacitor through the contacts of said signal relay whereby upon cessation of said signal, said capacitor will be connected to discharge through said winding and, if said signal was of sufficient duration, will actuate said start-stop relay, said start-stop relay having contacts adapted to control operation of the tape driving means of said transducing system.

2. Apparatus for controlling the operation of a dual track magnetic tape audio transducing system, said apparatus comprising an amplifier tuned to a control frequency, a signal relay controlled by the output of said amplifier, a capacitor adapted to be connected to an electrical power source through the contacts of said signal relay whereby said capacitor is charged at a predetermined rate during receipt of a signal of said control frequency at the input of said amplifier, a start-stop relay having a winding adapted to be connected to said capacitor through the contacts of said signal relay whereby upon cessation of said signal, said capacitor will be connected to discharge through said winding and, if said signal was of sufficient duration, will actuate said start-stop relay, said start-stop relay having contacts adapted to control operation of the tape driving means of said transducing system, an interval timer connected to be controlled by the contacts of said signal relay so that the operation of said interval timer will be commenced upon the receipt of such a control signal at the input of said amplifier, said interval timer having contacts which are actuated after a predetermined interval of operation of said interval timer, and a reversing relay controlled by said interval timer, said reversing relay having contacts adapted to control the reversal of said tape driving means.

3. Apparatus as claimed in claim 2 wherein the contacts of said interval timer are actuated only after a time interval which exceeds the time required for said condenser to charge sufficiently to actuate said start-stop relay whereby a control signal of relatively short duration will result in stopping of the tape and a signal of relatively long duration will result in reversal of the direction of movement of said tape.

4. Apparatus for controlling the operation of a dual track magnetic tape audio transducing system, said apparatus comprising an amplifier tuned to a control frequency, a signal relay controlled by the output of said amplifier, a capacitor adapted to be connected to an electrical power source through the contacts of said signal relay whereby said capacitor is charged at a predetermined rate during receipt of a signal of said control frequency at the input of said amplifier, a start-stop relay having a winding adapted to be connected to said capacitor through the contacts of said signal relay whereby upon cessation of said signal, said capacitor will be connected to discharge through said winding and, if said signal was of sufficient duration, will actuate said start-stop relay, said start-stop relay having contacts adapted to control the operation of the tape driving means of said transducing system, an interval timer connected to be controlled by the contacts of said signal relay so that the operation of said interval timer will be commenced upon the receipt of such a control signal at the input of said amplifier, said interval timer having contacts which are actuated after a predetermined interval of operation of said interval timer, and a reversing relay controlled by said interval timer, said reversing relay having contacts adapted to control the reversal of said tape driving means and other contacts adapted to impose on said amplifier a voltage which will prevent the actuation of said signal relay during brief cessation of said control signal due to reversal of said tape driving means.

5. Apparatus for controlling the operation of an audio transducing system including a plurality of magnetic tape transducers, said apparatus including an amplifier tuned to a control frequency, a signal relay controlled by the output of said amplifier, a capacitor adapted to be connected to an electrical power source through the contacts of said signal relay whereby said capacitor is charged at a predetermined rate during receipt of a signal of said control frequency at the input of said amplifier, a start-stop relay having a winding adapted to be connected to said capacitor through the contacts of said signal relay whereby upon cessation of said signal, said capacitor will be connected to discharge through said winding and, if said signal was of sufficient duration, will actuate said start-stop relay, said start-stop relay having contacts adapted to control the operation of the tape driving means of said transducing system, an interval timer connected to be controlled by the contacts of said signal relay and by the contacts of said reversing relay so that the operation of said interval timer will be commenced upon the receipt of such a control signal during the reverse travel of said tape, said interval timer having contacts adapted to terminate the operation of one of said transducers and to initiate the operation of another.

6. Apparatus for controlling the operation of an audio transducing system including a plurality of dual track magnetic tape transducers, an amplifier tuned to a control frequency, a signal relay controlled by the output of said amplifier, a capacitor adapted to be connected to an electrical power source through the contacts of said signal relay whereby said capacitor is charged at a predetermined rate during receipt of a signal of said control frequency at the input of said amplifier, a start-stop relay having a winding adapted to be connected to said capacitor through the contacts of said signal relay whereby upon cessation of said signal, said capacitor will be connected to discharge through said winding and, if said signal was of sufficient duration, will actuate said start-stop relay, said start-stop relay having contacts adapted to control the operation of the tape driving means of said transducing system, an interval timer connected to be controlled by the contacts of said signal relay so that the operation of said interval timer will be commenced upon the receipt of such a control signal at the input of said amplifier, said interval timer having contacts which are actuated after a predetermined interval of operation of said interval timer, a reversing relay controlled by said interval timer, said reversing relay having contacts adapted to control the reversal of said tape driving means, and other contacts adapted to impose on said amplifier a voltage which will prevent the actuation of said signal relay during brief cessation of said control signal due to reversal of said driving motor, and a second interval timer connected to be controlled by the contacts of said signal relay and by the contacts of said reversing relay so that the operation of said second interval timer will be commenced upon the receipt of such a control signal during the reverse travel of said tape, said second interval timer having contacts adapted to terminate the operation of one of said transducers and to initiate the operation of another.

7. Apparatus as claimed in claim 6 wherein the contacts of the first said interval timer are actuated after a time interval which exceeds the time required for said condenser to charge sufficiently to actuate said start-stop relay and wherein the contacts of said second interval timer are actuated after a time interval which exceeds the time required for actuation of the contacts of the first said interval timer whereby a signal of relatively short duration will result in stopping of the tape, a signal of intermediate duration will result in reversing of the tape and a signal of relatively long duration during the reverse travel of said tape will result in switching of operation from one tape mechanism to another.

8. Apparatus for controlling the stop and reverse operations of a plural track tape record machine, said apparatus comprising a first control switch adapted to control the stopping of the tape drive when running in either forward or reverse direction, a second control switch adapted to control the reversing of the tape drive from one direction of drive to another, signal sensing means for detecting a control signal recorded on the tape record, which signal has any one of at least two predetermined time durations and which can be detected only when said tape record is being driven by the tape drive, delay means controlled by said signal sensing means and connected to said first control switch to actuate it only after the end of a control signal which was at least somewhat longer than a first time duration, and means connecting said signal sensing means to said second control switch to actuate it slightly before the end of a control signal having a second time duration substantially longer than said first time duration.

9. The combination of elements as in claim 8 in further combination with temporary holding means acting in cooperation with said delay means for preventing actuation of said first control switch by a mere brief interruption in the control signal being sensed, said holding means however permitting actuation of said first switch a short time after the end of said control signal.

10. An arrangement for controlling the stop and at least one other operation of tape record machines using tape records on which a plurality of control signals having at least two different time durations are recorded, said arrangement comprising a tape driving mechanism, a first switch connected to control the stopping of said driving mechanism, a pickup head for detecting a control signal on the record, said head being able to detect a signal only when the tape record is moving relatively past the head, first actuating means connected to receive control signals from said pickup head and in response thereto to operate said first switch only after the end of a control signal which lasts at least as long as a first given interval of time, a second switch connected to control another operation of a tape record machine, and second actuating means connected to receive control signals from said pickup head and in response thereto to operate said second switch before the end of a control signal which last substantially longer than said first given interval.

References Cited in the file of this patent

UNITED STATES PATENTS

| | | |
|---|---|---|
| 2,116,314 | Jenkins et al. | May 3, 1938 |
| 2,336,777 | Clausen | Dec. 14, 1943 |
| 2,396,409 | Berzer | Mar. 12, 1946 |
| 2,552,788 | Hoover | May 15, 1951 |
| 2,553,410 | Handschin | May 15, 1951 |
| 2,571,973 | Walker | Oct. 16, 1951 |